United States Patent [19]

Maldavs

[11] 4,221,235
[45] Sep. 9, 1980

[54] QUICK DISCONNECT COUPLING
[75] Inventor: Ojars Maldavs, Lincoln, Nebr.
[73] Assignee: Gould Inc., Rolling Meadows, Ill.
[21] Appl. No.: 936,661
[22] Filed: Aug. 25, 1978
[51] Int. Cl.³ .................. F16L 37/22; F16L 37/28
[52] U.S. Cl. ..................... 137/614.04; 137/614.05; 251/149.6
[58] Field of Search .............. 137/614–614.05; 251/149.6

[56] References Cited
U.S. PATENT DOCUMENTS

| | | | |
|---|---|---|---|
| 2,735,696 | 2/1956 | Omon et al. | 137/614.05 |
| 3,163,178 | 12/1964 | Stratman | 137/614 |
| 3,236,251 | 2/1966 | Hansen | 137/614.05 |
| 3,348,575 | 10/1967 | Simak | 137/614.05 |
| 3,431,942 | 3/1969 | Kopaska | 137/614.05 |
| 3,490,491 | 1/1970 | Kopaska | 137/614.05 |
| 3,530,887 | 9/1970 | Stratman | 137/614.05 |
| 3,646,964 | 3/1972 | Stratman | 137/614.03 |
| 3,674,051 | 7/1972 | Stratman | 137/614.04 |
| 3,791,411 | 2/1974 | Bogeskov et al. | 251/149.6 |

Primary Examiner—Martin P. Schwadron
Assistant Examiner—A. Michael Chambers
Attorney, Agent, or Firm—Russell E. Baumann; Edward E. Sachs

[57] ABSTRACT

A quick disconnect coupling comprising a female coupling and a male coupling is provided with shrouding around the valves of the couplings. The female coupling includes a poppet slidably mounted within a shroud, and fluid can flow freely between the shroud and the poppet so that the poppet will close quickly when the couplings are disconnected. The male coupling includes a ball valve mounted within the shroud, and fluid can flow freely between the shroud and the ball so that the ball will close quickly when the couplings are disconnected. The elongated parts of the poppet of the female coupling and the shroud of the male coupling are formed from deep drawn sheet metal.

8 Claims, 7 Drawing Figures

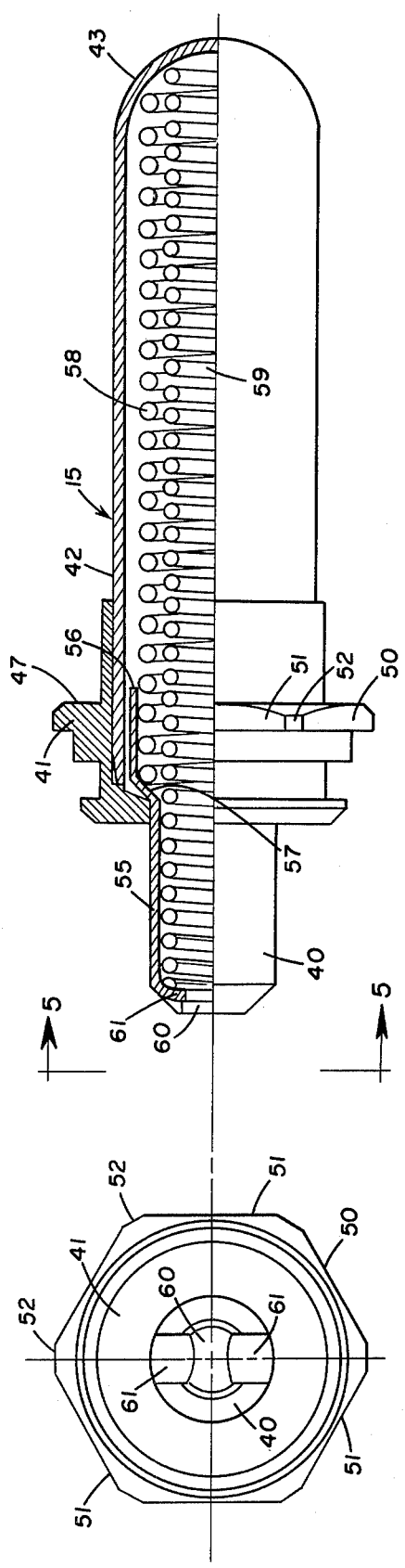
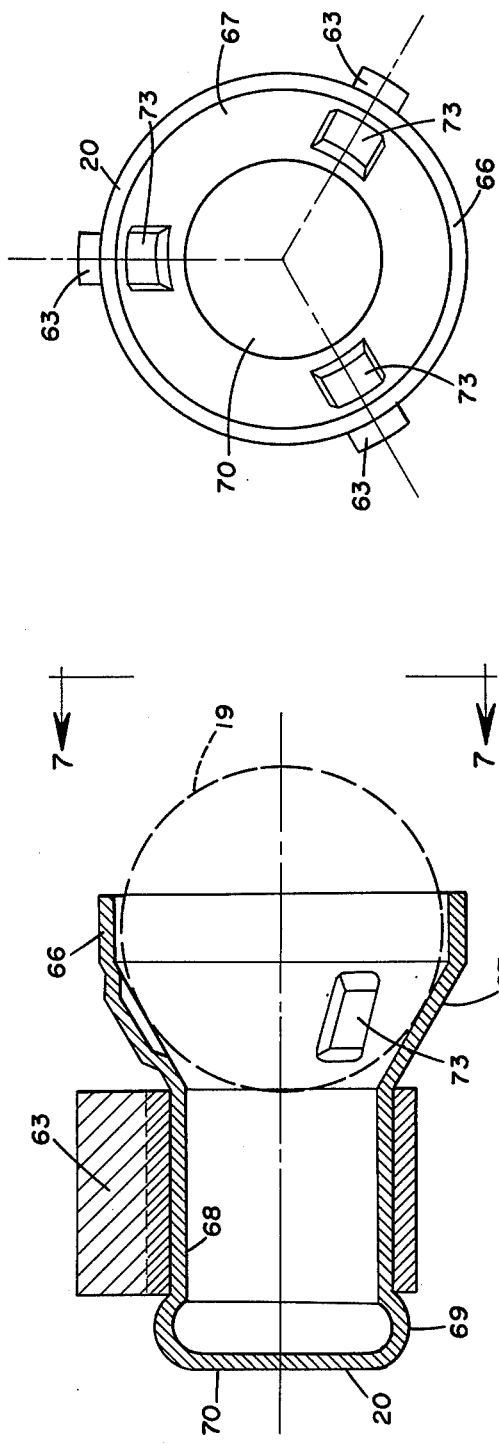

QUICK DISCONNECT COUPLING

BACKGROUND AND SUMMARY

This invention relates to a quick disconnect coupling, and, more particularly, to a coupling used in connection with pressurized fluid. For example, agricultural tractors have a quick disconnect coupling for connecting and disconnecting hydraulic hoses between the tractor and a hydraulically operated implement. The agricultural tractor provides the power source to operate the implement hydraulic components. Hydraulic hoses connect the tractor power source to the implement hydraulic system. Quick disconnect couplings are used on the hydraulic hoses to enable disconnecting the implement from the tractor. The female half of the coupling is mounted on the tractor, and the male half of the coupling is on the implement hoses.

Because of the variety of operating conditions on agricultural applications, the coupling must often function under unique conditions and perform special functions not normal to conventional quick disconnect couplings. Some of these functions include withstanding high surge flows of oil (as high as four times the normal flow rate is common) and connecting and disconnecting while the hoses are pressurized and/or flowing oil.

Some prior art couplings, for example, those described in U.S. Pat. Nos. 3,431,942, 3,530,887, and 3,646,964, perform these functions, but these couplings have the following limitations and problems:

1. The shrouding around the valves creates a low pressure area behind the valve during disconnect. This retards the closing of the valves when disconnecting, and causes an oil spray or excessive oil spillage.

2. Some designs overcome the situation described above by increasing the clearances between the shroud and the valves. This corrects the closing problem but creates another problem. The increased clearance reduces the guiding ability of the shroud. Then the valve will not center on the seat during closing.

3. The long tubular internal parts are expensive to machine from solid material.

The invention provides a quick disconnecting coupling which solves all of the foregoing problems. The female coupling includes a poppet which is slidably mounted within a shroud, and the poppet includes a guide portion having a hexagonally shaped periphery which guides the sliding movement of the poppet within the shroud. The rounded corners of the hexagonal guide portion provide close guiding in the bore of the shroud to center the poppet, and the flats of the hexagon provide flow passages which permit oil to reach the back side of the poppet quickly when disconnecting. The long parts of the poppet are formed inexpensively by deep drawing from sheet stock rather than machining. The male coupling includes a deep drawn shroud which is provided with radially enlarged dimples which permit oil to flow past the ball valve of the coupling when disconnecting.

DESCRIPTION OF THE DRAWING

The invention will be explained in conjunction with an illustrative embodiment shown in the accompanying drawing, in which —

FIG. 4 is an elevational view, partially in section, of the poppet assembly of the female coupling;

FIG. 5 is an end view of the poppet assembly taken along the line 5—5 of FIG. 4;

FIG. 6 is a sectional view of the shroud of the male coupling; and

FIG. 7 is an end view of the shroud of the male coupling.

DESCRIPTION OF SPECIFIC EMBODIMENT

Figure 1:
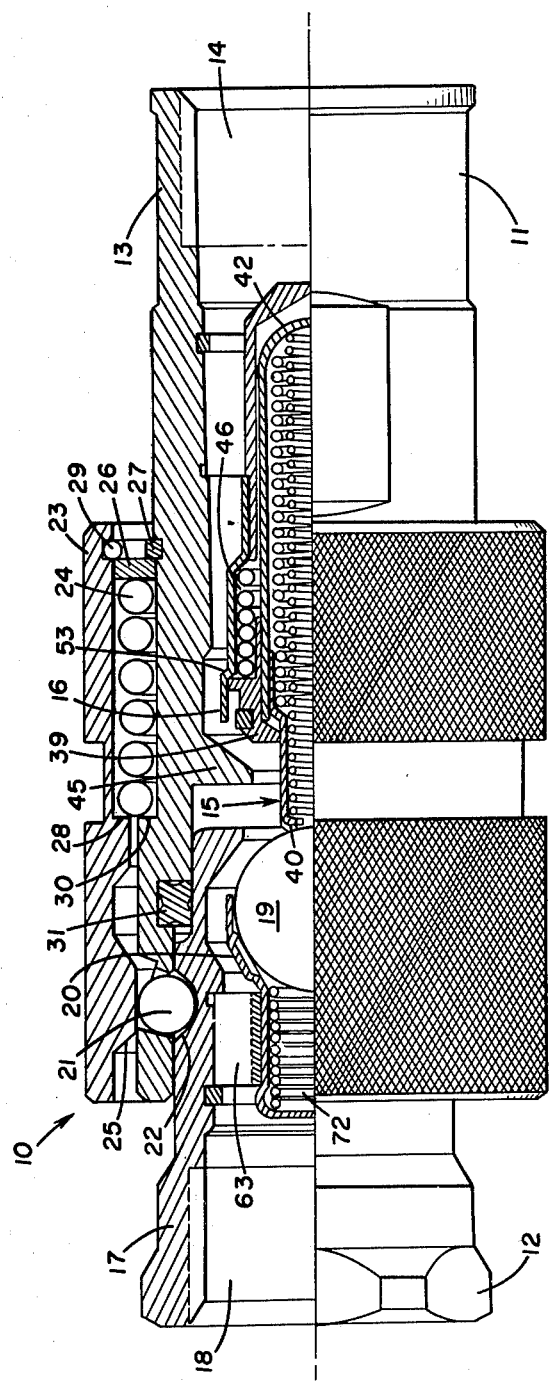
FIG. 1 is an elevational view, partially in section, of the inventive coupling showing the female coupling and the male coupling connected together.

Referring first to FIG. 1, the numeral 10 designates a quick connect and disconnect coupling which includes a female coupling 11 and a male coupling 12. The female coupling includes an outer tubular housing 13 having an internal bore 14 and a poppet assembly 15 which is slidably mounted in a tubular shroud 16. The male coupling includes an outer tubular housing 17 having an internal bore 18 and a ball 19 which is retained within a shroud 20.

The couplings are locked together in FIG. 1 by a plurality of conventional locking balls 21 which are pressed into a groove 22 in the male coupling by a sleeve 23 which is slidably mounted on the female coupling. The couplings can be disconnected by grasping the male coupling and the knurled outer surface of the sleeve and pulling them apart. The sleeve moves to the right against the bias of the spring 24 until the camming portion 25 of the sleeve permits the locking balls to be cammed outwardly by the groove in the male coupling. The male coupling can then be withdrawn from the bore of the female coupling. The spring 24 engages a washer 26 which abuts a lock ring 27 on the housing of the female coupling. The spring engages a shoulder 28 on the sleeve and resiliently biases the sleeve to the left until a lock ring 29 on the sleeve engages a washer 26, at which time the spring also engages a shoulder 30 on the housing.

The male and female couplings are connected by pulling the sleeve 23 away from the open end of the female housing and pushing the male coupling into the female coupling. The locking balls are cammed outwardly until they are able to fall into the locking groove 22. The camming portion 25 of the sleeve 23, which may be released as soon as the balls are cammed outwardly, force the balls into the locking groove. A seal ring 31 on the inside of the female coupling sealingly engages the male coupling.

Figure 2:
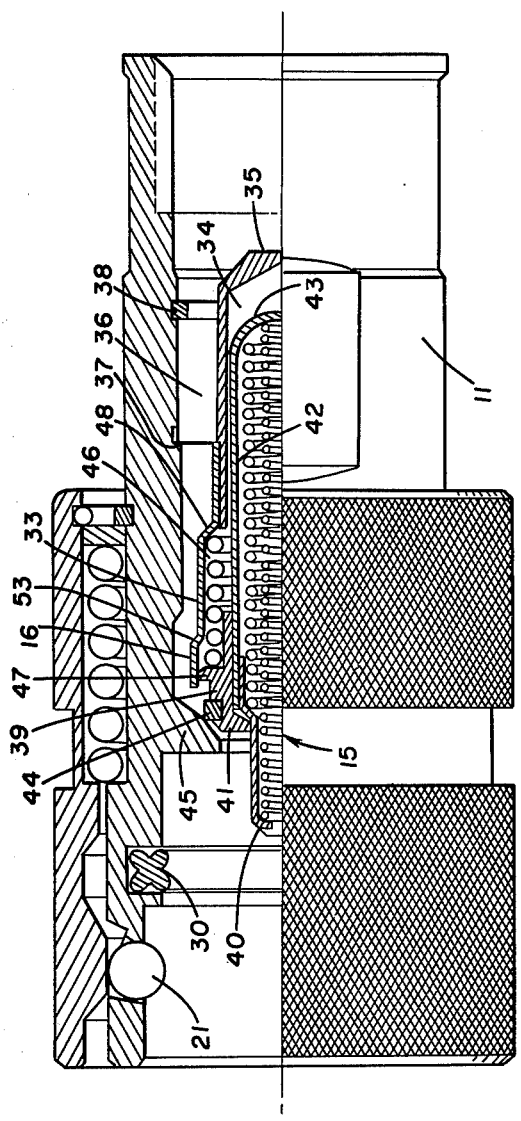
FIG. 2 is a view similar to FIG. 1 showing the female coupling disconnected from the male coupling.

Referring now to FIG. 2, the shroud 16 includes a generally cylindrical front portion 33 and a tubular rear portion 34 which has a closed rear end 35. The rear portion is inserted into the front portion, and the shroud is supported within the female housing by a spider support 36. The three legs of the spider support are retained between a shoulder 37 on the inside of the female housing and a lock ring 38.

The poppet assembly includes a poppet 39 which is slidably mounted within the shroud and an actuator 40, which is slidably mounted within the poppet.

The poppet 39 includes a forward seat or guide portion 41 and a rearwardly extending tubular stem portion 42 which has a spherical or dome-shaped closed rear end 43. A seal ring 44 on the guide portion is resiliently urged against a radially inwardly extending poppet seat 45 on the female housing by a poppet spring 46. The poppet spring engages a shoulder 47 on the guide portion of the poppet and a shoulder 48 on the front portion of the shroud.

Referring to FIGS. 4 and 5, the guide portion 41 of the poppet has a hexagonally shaped outer periphery 50 just forwardly of the shoulder 47. The hexagon includes six flat surface 51 and six corners 52, i.e., the intersections between adjacent flat surfaces. The corners are slightly squared off by short flats, and the flats are radiused or rounded to provide a relatively smooth contour between the adjacent flat surfaces 51 of the hexagon.

The rounded corners 52 of the hexagon are sized to provide close guiding of the poppet within the bore of the shroud 16 between the open forward end of the shroud and the stop shoulder 53 (see FIG. 1). The poppet assembly therefore remains centered within the shroud and the female coupling as it moves between its closed position shown in FIG. 2 and its open position shown in FIG. 1. The flat surfaces 51 of the hexagon flow passages between the corners to permit fluid within the female coupling to reach the rear end of the poppet stem 42 to quickly close the poppet when the male and female couplings are disconnected.

The actuator 40 includes a tubular forward portion 55 (FIG. 4) which slides in a circular opening in the guide portion of the poppet and a radially enlarged rear portion 56 which slides within the poppet stem 42. A stop shoulder 57 joins the front and rear portions of the actuator. A pair of coil springs 58 and 59 resiliently bias the actuator toward its forward position shown in FIG. 4 in which the stop shoulder 57 engages the opening in the guide portion of the poppet. The forward end of the actuator is provided with an opening 60, and a pair of tongue portions 61 (compare FIGS. 4 and 5) are pressed rearwardly from the periphery of the opening to provide a flow passage when the actuator engages the ball 19 of the male coupling.

The actuator 40 and the tubular stem 42 of the poppet are formed inexpensively by deep drawing sheet metal stock. The only machined part of the poppet assembly is the guide portion 41, which is short and easy to machine. Even though the stem portion 42 is drawn from sheet metal, the spherical rear end 43 provides sufficient strength to withstand the hydraulic pressure to which it is subjected.

Although the outer periphery of the guide portion 41 which is illustrated is hexagonal, it will be understood that other polygonal shapes can be used. The hexagonal shape is advantageous because it has enough rounded corners to provide good guiding support for the poppet to keep the poppet centered as it moves back and forth and also provides enough space between the flat surfaces of the polygon and the inside surface of the shroud to permit free flow of fluid into the shroud to assist in closing the poppet when disconnecting.

Figure 3:
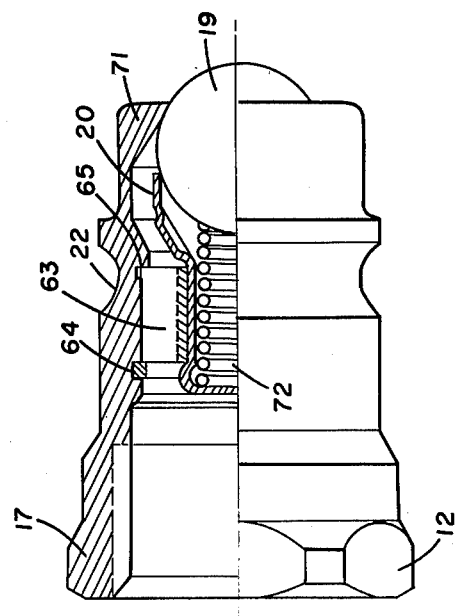
FIG. 3 is a view similar to FIG. 1 showing the male coupling disconnected from the female coupling.

Turning now to FIGS. 3, 6, and 7, the shroud 20 of the male coupling is mounted within the male housing by a spider support 63, the legs of which are retained between a stop ring 64 (FIG. 3) and a shoulder 65 on the housing. The shroud includes a cylindrical forward portion 66 which has an inside diameter slightly greater than the diameter of the ball 19, a frusto-conical portion 67, a cylindrical intermediate portion 68 which is retained within the collar of the spider support, and a radially enlarged rear portion 69 which provides a closed rear end 70.

The ball is resiliently biased into engagement with a seat 71 at the forward end of the male housing by a spring 72 which is compressed between the ball and the rear end of the shroud. As will be explained more fully hereinafter, the ball is movable away from the valve seat to its open position illustrated in phantom in FIG. 6 in which it engages the frusto-conical portion 67 of the shroud. However, fluid passages are provided by radially outwardly extending enlargements or dimples 73 in the frusto-conical portion which permit fluid to flow behind the ball to provide quick closing when the couplings are disconnected. The cylindrical forward portion of the shroud is slightly larger than the ball to permit fluid flow therebetween while still providing good guiding action for the ball to maintain the ball substantially centered with respect to the valve seat 71.

The shroud 20 of the male coupling is also advantageously formed by deep drawing sheet metal stock to provide high strength at low cost.

OPERATION

It is believed that the operation of the coupling device described will be apparent to those familiar with quick disconnect couplings. If the male coupling does not contain any residual fluid pressure and the female coupling is pressurized when the male and female couplings are connected, the actuator 40 of the female coupling will open the ball valve 19 of the male coupling. The actuator springs 58 and 59 will be compressed after rearward movement of the ball is stopped by the frusto-conical portion of the shroud 20. After the couplings are connected, the operator operates the hydraulic valves to dump the fluid in the female coupling into the fluid reservoir to relieve the pressure in the female coupling, and the actuator springs 58 and 59, which are stronger than the poppet spring 46, will move the poppet rearwardly against the bias of the spring 46 to open the female coupling. The operator may then operate the hydraulic valves to force fluid through the couplings to the implement.

If the male coupling is pressurized by residual fluid and the female coupling is pressurized when the couplings are connected, the ball 19 moves the actuator rearwardly within the poppet. The operator then dumps the fluid within the female coupling to permit the actuator springs 58 and 59 to unseat the poppet from the seat 45. When the hydraulic valve is opened, the high pressure fluid in the female coupling, assisted by the force exerted by the actuator springs 58 and 59, unseats the ball valve 19.

The shrouds 16 and 20 of the female coupling and male coupling protect the poppet valve and the ball valve against high surge flows of fluid. When the couplings are disconnected, the poppet spring 46 of the female coupling and the ball valve spring 72 of the male coupling urge the poppet and the ball valve to their closed positions, and high pressure fluid can flow freely into the space behind the poppet and the space behind the ball valve so that the pressurized fluid does not retard their closing. The poppet and the ball valve move to their closed position before the forward end of the male coupling is withdrawn past the seal ring 31 on the female coupling to prevent oil from spilling from the couplings.

The elongated deep drawn stem portion 42 of the poppet has a substantially longer length than the machined guide portion 41, and the majority of the length of the poppet is provided by the drawn stem portion. The entire length of the actuator 40 and the male shroud 20 are formed by deep drawing. As a result, the long tubular internal parts of the couplings are formed inexpensively.

While in the foregoing specification a detailed description of a specific embodiment of the invention was set forth for the purpose of illustration, it will be understood that many of the details hereingiven may be varied considerably by those skilled in the art without departing from the spirit and scope of the invention.

I claim:

1. A quick disconnect female coupling for coaction with a check valve-equipped male coupling, the female coupling comprising:
 a generally tubular housing having an axially extending bore for receipt of said male coupling in one end thereof and a rearwardly extending poppet seat,
 a shroud including a tubular portion and a closed end mounted within the bore of the housing and having an internal passage opening toward said one end of the bore and an inner guide surface,
 a poppet slidably mounted in the internal passage of the shroud, the poppet having guide means spaced apart around its periphery for slidably engaging the guide surface of the shroud and guiding the sliding movement of the poppet within the shroud, the portions of the poppet between said spaced-apart guide means being spaced radially inwardly of the guide surface of the shroud for permitting flow of fluid into the internal passage of the shroud between the spaced guide means, said poppet having a sealing portion which does not slidably engage said inner guide surface,
 and first spring means within the shroud engaging said end for resiliently biasing the poppet sealing portion into engagement with the poppet seat on the housing when said female coupling is closed.

2. The female coupling of claim 1 in which the poppet guide means have a generally polygonally shaped periphery having a plurality of rounded corners which slidably engage the guide surface of the shroud and wherein said portions between said guide means have a substantially flat surface extending between each pair of adjacent corners.

3. The female coupling of claim 1 in which the poppet has an internal passage opening toward said one end of the bore, an actuator slidably mounted in the internal passage of the poppet, and a second spring means disposed within said shroud resiliently biasing the actuator toward said one end of the bore.

4. The female coupling of claim 3 in which the poppet guide means includes a guide portion and an elongated tubular stem portion having a first end secured to the guide portion and spaced from the guide portion, the guide portion being formed of machined metal and being provided with a central opening through which said actuator extends, said guide portion providing said guide means and being engageable with said poppet seat on the housing, the stem portion being formed of deep drawn metal and forming the major part of the length of the poppet.

5. The female coupling of claim 4 in which the closed end of the stem portion is dome-shaped.

6. The female coupling of claim 4 in which the actuator is tubular and is formed of deep drawn metal.

7. The female coupling of claim 4 in which the guide portion includes a generally polygonally shaped periphery having a plurality of rounded corners which slidably engage the guide surface of the shroud and provides said guide means and a substantially flat surface extending between each pair of adjacent corners for providing a space between the guide portion and the guide surface of the shroud for permitting flow into the internal passage of the shroud.

8. The female coupling of claim 1 in combination with a male coupling, the male coupling having a generally tubular housing having an axially extending bore and a valve seat at one end of the bore, a shroud mounted within the bore of the male coupling and having an internal passage opening toward said valve seat and a generally frusto-conical portion adjacent the valve seat and an adjacent tubular portion, a ball within the frusto-conical portion, and spring means within the shroud for resiliently biasing the ball into engagement with the valve seat, the frusto-conical portion having radially outwardly extending enlargements for permitting fluid flow past the ball when the ball engages the tubular portion when the male coupling is open.

* * * * *